(12) United States Patent
Malhotra et al.

(10) Patent No.: US 6,287,373 B1
(45) Date of Patent: Sep. 11, 2001

(54) INK COMPOSITIONS

(75) Inventors: Shadi L. Malhotra; Raymond W. Wong; Marcel P. Breton, all of Mississauga (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/599,762

(22) Filed: Jun. 22, 2000

(51) Int. Cl.$^7$ .................................................. C09D 11/00
(52) U.S. Cl. ..................................... 106/31.29; 106/31.43; 106/31.61; 106/31.75
(58) Field of Search .......................... 106/31.43, 31.75, 106/31.29, 31.61

(56) References Cited

U.S. PATENT DOCUMENTS

| | | | |
|---|---|---|---|
| 4,308,547 | 12/1981 | Lovelady et al. | 346/140 R |
| 4,490,731 | 12/1984 | Vaught | 346/140 R |
| 4,697,195 | 9/1987 | Quate et al. | 346/140 R |
| 4,745,419 | 5/1988 | Quate et al. | 346/140 R |
| 4,751,528 | 6/1988 | Spehrley, Jr. et al. | 346/140 R |
| 4,751,529 | 6/1988 | Elrod et al. | 346/140 R |
| 4,751,530 | 6/1988 | Elrod et al. | 346/140 R |
| 4,751,534 | 6/1988 | Elrod et al. | 346/140 R |
| 4,791,439 | 12/1988 | Guiles | 346/140 R |
| 4,797,693 | 1/1989 | Quate | 346/140 R |
| 4,801,953 | 1/1989 | Quate | 346/140 R |
| 4,840,674 | 6/1989 | Schwarz | 106/22 |
| 4,853,036 | 8/1989 | Koike et al. | 106/20 |
| 5,006,170 | 4/1991 | Schwarz et al. | 106/20 |
| 5,028,937 | 7/1991 | Khuri-Yakub et al. | 346/104 R |
| 5,041,161 | 8/1991 | Cooke et al. | 106/22 |
| 5,041,849 | 8/1991 | Quate et al. | 346/140 R |
| 5,111,220 | 5/1992 | Hadimioglu et al. | 346/140 R |
| 5,121,141 | 6/1992 | Hadimioglu et al. | 346/140 R |
| 5,122,187 | 6/1992 | Schwarz et al. | 106/25 |
| 5,124,718 | 6/1992 | Koike et al. | 346/1.1 |
| 5,371,531 | 12/1994 | Rezanka et al. | 347/43 |
| 5,667,568 | 9/1997 | Sacripante et al. | 106/20 R |
| 5,693,128 | 12/1997 | Sacripante et al. | 106/31.27 |
| 5,698,017 | 12/1997 | Sacripante et al. | 106/31.49 |
| 5,700,316 | 12/1997 | Pontes et al. | 106/31.58 |
| 5,876,492 | 3/1999 | Malhotra et al. | 106/31.58 |
| 5,902,390 | 5/1999 | Malhotra et al. | 106/31.58 |
| 5,922,117 | 7/1999 | Malhotra et al. | 106/31.58 |
| 5,931,995 | 8/1999 | Malhotra et al. | 106/31.58 |
| 6,066,200 | 5/2000 | Breton et al. | 106/31.43 |

*Primary Examiner*—C. Melissa Koslow
*Assistant Examiner*—Veronica F. Faison
(74) *Attorney, Agent, or Firm*—E. O. Palazzo

(57) ABSTRACT

An ink composition containing, for example, (1) an oxazoline compound; (2) a thiourea compound; (3) an oxime compound; (4) a lightfastness compound; (5) an antioxidant; and (6) a colorant.

25 Claims, No Drawings

INK COMPOSITIONS

REFERENCE TO COPENDING PATENT APPLICATIONS

Inks are illustrated in U.S. Pat. Nos. 5,931,995; 5,902,390; 5,876,492, 5,922,117 and U.S. Pat. No. 6,066,3200, U.S. Pat. No. 6,110,265, U.S. Pat. No. 6,096,124, U.S. Pat. No. 6,071,333, U.S. Pat. No. 6,086,661, and U.S. Pat. No. 6,096,125, the disclosures of each being totally incorporated herein by reference.

Illustrated in copending application U.S. Pat. No. 6,106,601, the disclosure of which is totally incorporated herein by reference, is an ink composition comprised of (1) an oxazoline compound; (2) a thiourea compound with an optional melting point of from about 25° C. to about 100° C., and with an optional acoustic-loss value of from about 5 to about 40 dB/mm; (3) an alcohol; (4) a lightfastness compound; (5) an antioxidant; and (6) a colorant.

The appropriate components and processes of the copending applications may be selected for the present invention in embodiments thereof.

BACKGROUND OF THE INVENTION

The present invention is directed to ink compositions and, more specifically, the present invention relates to inks with, for example, a melting point of between about 60° C. and about 150°C., and preferably between about 70 to about 90° C., especially useful for acoustic ink printing, processes and apparatuses, reference, for example, U.S. Pat. No. 5,121,141, U.S. Pat. No. 5,111,220, and U.S. Pat. No. 5,371,531, the disclosures of which are totally incorporated herein by reference, including especially acoustic ink processes as illustrated in a number of the above copending applications, such as an acoustic ink printer for printing images on a record medium. The inks of the present invention in embodiments can be considered (1) a phase change ink, that is, for example, an ink that changes from a liquid state to solid state in a suitable period of time, for example, from about 1 to about 100 milliseconds and preferably in less than about 10, such as from about 2 to about 7 milliseconds, and which inks contain a nonaqueous phase-change color spreading compound, or an additive, such as oxazoline compound that, for example, can fill the pores of a substrate, such as paper, and which compound has a melting point of, for example, lower than about 120° C. and preferably between about 60 to about 100° C., and with a low acoustic loss value of, for example, below about 100 dB/mm; (2) a nonaqueous crease improving thiourea compound or mixtures thereof with, for example, a boiling point of equal to about or higher than about 150° C. (Centigrade) and more specifically with a boiling point from about 150 to about 225° C., and a melting point of between about 25 to about 100° C., and preferably between about 60 to about 100° C., with low acoustic loss, which primarily enables a reduction or minimization of energy consumption, and which acoustic loss is below, or about equal to 60 dB/mm; (3) a gloss improving oxime compound or mixtures thereof; (4) a lightfastness component, such as a lightfastness UV absorber; (5) a lightfastness antioxidant; and (6) a colorant such as a dye, a pigment or mixtures thereof.

More specifically, the present invention is directed to phase-change acoustic ink compositions comprised of (1) a nonaqueous solid oxazoline compound with, for example, a melting point of lower than about 120° C. and preferably between about 60° C. and about 100° C., and possessing a low acoustic loss and which acoustic loss is, for example, below about 100 dB/mm, and preferably from about 25 to about 80 dB/mm; (2) a nonaqueous thiourea compound or mixtures thereof with, for example, a melting point of between about 25° C. to about 100° C., and preferably between about 60° C. to about 90° C., and with low acoustic loss and which acoustic loss is, for example, below about 60 dB/mm, and preferably between about 5 to about 40 dB/mm; (3) a gloss improving oxime compound or mixtures thereof with a boiling point of, for example, equal to about or higher than about 150° C. and lower than about 350° C., preferably between about 170° C. to about 220° C., and a melting point of, for example, between about 25° C. to about 90° C. and with a low acoustic loss and which acoustic loss is, for example, below or about equal to 60 dB/mm, and preferably in the range of between about 5 to about 40 dB/mm; (4) a lightfastness compound, such as a UV absorber; (5) an antioxidant; (6) a colorant, and wherein there can be generated with such inks excellent developed images on plain and coated papers with acceptable image permanence, excellent projection efficiency on transparencies without a post fusing step, and excellent crease resistance, and wherein the inks possess acceptable, and in embodiments superior lightfast, for example about 89 to about 100 percent and superior waterfast between, for example, about 94 to about 100 percent. Moreover, in embodiments of the present invention there is enabled the elimination, or minimization of undesirable paper curl since water need not be present. When water is not present in the inks, a dryer can be avoided thereby minimizing the cost of the acoustic ink jet apparatus and process.

PRIOR ART

In acoustic ink printing, the printhead produces approximately 2.2 picoliter droplets by an acoustic energy process. The ink under these conditions should display a melt viscosity of about 5 centipoise or less at the jetting temperature. Furthermore, once the ink is jetted onto the paper, the ink image should be of excellent crease property, and should be nonsmearing waterfast, of excellent transparency and excellent fix qualities. In selecting an ink for such applications, it is desirable that the vehicle display a low melt viscosity, such as from about 1 centipoise to about 25 centipoise in the acoustic head, while also displaying solid like properties after being jetted onto paper. Since the acoustic head can tolerate a temperature up to about 180° C., and preferably up to a temperature of from about 140° C. to about 160° C., the vehicle for the ink should preferably display liquid like properties such as a viscosity of 1 to about 10 centipoise at a temperature of from about 75° C. to about 165° C., and solidify or harden after jetting onto paper such that the ink displays a hardness value of from about 0.1 to about 0.5 millimeter utilizing a penetrometer according to the ASTM penetration method D1321.

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is chosen to have a melting point above room temperature so that the ink, which is melted in the apparatus, will not be subject to evaporation or spillage during periods of nonprinting. The vehicle selected possesses a low critical temperature to permit the use of the solid ink in a thermal ink jet printer. In thermal ink jet printing processes employing these phase-change inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Phase-change ink jets are somewhat similar to thermal ink jets; however, a phase-change ink usually contains no solvent. Thus, rather than being liquid at room temperature, a phase-change ink is typically a solid with a wax-like consistency. These inks usually are heated, for example, to approximately 100° C. before the ink melts and converts to a liquid. With phase-change inks, a plurality of ink jet nozzles is provided in a printhead, and a piezoelectric vibrating element is located in each ink channel upstream from a nozzle so that the piezoelectric oscillations propel ink through the nozzle. After the phase-change ink is applied to the substrate, freezing on the substrate resolidifies the ink.

Each of these types of known ink jets, however, has a number of advantages and disadvantages. One advantage of thermal ink jets is their compact design for the integrated electronics section of the printhead. Thermal ink jets are disadvantageous in that the thermal ink has a tendency to soak into a plain paper medium. This blurs the print or thins out the print locally thereby adversely affecting print quality. Problems have been encountered with thermal ink jets in attempting to rid the ink of moisture fast is enough so that the ink does not soak into a plain paper medium. This is particularly true when printing with color. Therefore, usually when printing with thermal ink coated papers are used, which papers are more costly than plain paper.

One advantage of a phase-change ink is its ability to print on plain paper since the phase-change ink quickly solidifies as it cools and, since it is primarily waxy in nature, it does not normally soak into a paper medium. However, phase-change ink jet systems can be cumbersome in structure and in design, that is, the associated integrated electronics of a thermal ink jet head are considerably more compact than those of a phase-change ink jet head.

U.S. Pat. No. 4,751,528, the disclosure of which is totally incorporated herein by reference, discloses a phase-change ink jet device which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify phase-change ink in a selected zone more rapidly to avoid offset by a pinch roll coming in contact with the surface of the substrate to which phase-change ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with phase-change inks with an integrally connected ink jet head and reservoir system, the reservoir system including a highly efficient heat conducting plate inserted within an essentially nonheat conducting reservoir housing.

Ink compositions for ink jet printing are known as illustrated, for example, in U.S. Pat. No. 4,840,674, the disclosure of which is totally incorporated herein by reference, and which patent discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like.

U.S. Pat. No. 5,041,161, the disclosure of which is totally incorporated herein by reference, discloses an ink jet ink, which is a phase-change ink at room temperature.

U.S. Pat. No. 4,853,036 and U.S. Pat. No. 5,124,718 disclose an ink for ink jet recording and which ink comprises a liquid composition essentially comprising a coloring matter, a volatile solvent with a vapor pressure of 1 millimeter Hg or more at 25° C., and a compound being solid at room temperature and having a molecular weight of 300 or more.

U.S. Pat. No. 5,667,568 discloses an ink composition comprised of a colorant and a bisamide with a viscosity of from about 1 centipoise to comprised of the condensation product of an organic acid and an amino alcohol.

U.S. Pat. No. 5,693,128 discloses an ink composition comprised of a colorant and a reversible crosslinked component vehicle obtained from is the reaction product of an anhydride and an organoamine, and which ink possesses a viscosity of from about 1 centipoise to about 25 centipoise at a temperature of from about 125° C. to about 185° C.

U.S. Pat. No. 5,700,316 discloses an ink composition comprised of a colorant and a vehicle of a poly(alkylene oxide)-alkylate, a poly(alkylene oxide)-dialkylate, a polyoxa-alkanoate ester, or a polyoxa-alkanedioate diester, and which ink possesses a viscosity of from about 1 centipoise to about 15 centipoise at a temperature of from about 125° C. to about 165° C.

SUMMARY OF THE INVENTION

While the known ink compositions and processes may be suitable for their intended purposes, a need remains for acoustic phase-change ink compositions suitable for ink jet printing. In addition, there is a need for phase-change ink compositions, which are compatible with a wide variety of plain papers and yield photographic quality images on plain and coated papers. Further, there is a need for phase-change ink compositions, which generate high quality, lightfast, and waterfast images on plain papers. There is also a need for phase-change ink jet ink compositions which generate high quality, fast-drying images on a wide variety of plain papers at low cost with high quality text and high quality graphics, and wherein the colorant, such as the dye, is retained on the paper surface while the ink vehicle can continue to spread within the paper structure. Further, there is a need for phase-change ink jet ink compositions, which exhibit minimal feathering. Additionally, there is a need for phase-change ink jet ink compositions, which exhibit minimal intercolor bleed. There is also a need for phase-change ink jet ink compositions, which exhibit excellent image permanence. Moreover, there is a need for phase-change ink jet ink compositions, which are suitable for use in acoustic ink jet printing processes. Additionally, there is a need for phase-change hot ink compositions suitable for ink jet printing processes wherein the substrate is heated prior to printing and is cooled to ambient temperature subsequent to printing (heat and delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided. Another need resides in inks with a spherulite (spherical ink crystals) size during solidification that can be reduced from the conventional about 6 to about 9 micrometers to about 2 to about 4 micrometers, and in embodiments to about 1 to about 2 micrometers, by crystallinity inhibitor diluents derived from low melting alcohols to thereby, for example, improve projection efficiency and crease resistance. There is also a need for low viscosity inks, thereby permitting, for example, reduced power consumption by about 35 percent thereby increased printing speed from, for example, about 25 pages per minute to about 40 pages per minute, and which inks can enable improved jettability resulting in excellent ink directionality and consequently lower edge raggedness of the prints such as a value of about 5 microns and preferably lower than about 3 microns. The edge raggedness refers to, for example, the deviation of the average width of a line measured from the middle of the line to the edge of the line (also known as mid-frequency line-edge noise (MFLN)) and can be measured with an optical microscope. Moreover, there is a need for inks that generate images that are durable (crease less than about 60) and can withstand the pressures of paper folding such that there is substantially no loss, or no loss of information, wherein crease is measured on images printed with the inks of the present invention in the same known manner as used in the evaluation of xerographic images. The average width of the creased image due to pressure can be obtained on colored and black solid area images printed on paper by (a) folding inward the printed area of the image; (b) passing on the folded image a standard TEFLON coated copper roll 2 inches in width, 3 inches in outer diameter, 2.25 inches in inner diameter and weighing 860 grams; (c) unfolding the paper and wiping the loose toner from the creased imaged surface with a cotton swab; and (d) measuring the average width of the ink free creased area with an image analyzer.

These and other needs can be achievable with the inks of the present invention in embodiments thereof.

DETAILED DESCRIPTION OF THE INVENTION

Aspects of the present invention relate to an ink composition comprised of (1) an oxazoline compound; (2) a thiourea compound; (3) an oxime compound; (4) a lightfastness compound; (5) an antioxidant; and (6) a colorant; an ink composition wherein the thiourea compound is comprised of a mixture of thioureas, and the oxime is comprised of a mixture of oximes; an ink composition wherein the thiourea possesses a melting point of from about 25° C. to about 100° C. and an acoustic loss of from about 5 to about 85 dB/mm; an ink which possesses an acoustic-loss value of from about 10 to about 80 dB/mm, a viscosity of from about 1 centipoise to about 12 centipoise at a temperature of from about 125° C. to about 165° C., and which ink optionally yields images with crease values of from about 5 to about 15; an ink composition wherein the thiourea compound is selected from the group consisting of (1) 1-allyl-2-thiourea; (2) 1-allyl-3-(2-hydroxyethyl)-2-thiourea; (3) 1-methyl-2-thiourea; (4) 1-methallyl-3-methyl-2-thiourea; (5) 1,3-dibutyl-2-thiourea; (6) 1,1,3,3-tetramethyl-2-thiourea; (7) N,N'-di-n-propyl thiourea; and (8) 1-benzyl-3-methyl-2-thiourea; an ink composition wherein the oxime compound is selected from the group consisting of (1) 2,3-butanedione monoxime, (2) acetone oxime, (3) cyclohexanone oxime, (4) 4-(trifluoromethoxy) benzamidoxime, (5) 2-nitrobenzaldoxime, and (6) 1-phenyl-1,2-propanedione 2-oxime; an ink composition wherein the oxazoline compound is selected from the group consisting of (1) 5-(hydroxymethyl)-5'(methoxy stearate) oxazoline; (2) 2-stearyl-5-(hydroxymethyl)-5'(methoxy stearate) oxazoline; and (3) mixtures thereof; an ink composition wherein the lightfastness compound is selected from the group consisting of (1) 1,1-(1,2-ethane diyl) bis(3,3,5,5-tetramethyl piperazinone); (2) 6-ethoxy-1,2-dihydro-2,2,4-trimethyl quinoline; (3) 2-(4-benzoyl-3-hydroxyphenoxy) ethyl acrylate; (4) 2-dodecyl-N-(2,2,6,6-tetramethyl-4-piperidinyl)succinimide; and (5) 1,2,2,6,6-pentamethyl-4-piperidinyl/$\beta,\beta,\beta',\beta'$,-tetra methyl-3,9-(2,4,8,10-tetraoxospiro(5,5) undecane) diethyl]-1,2,3,4-butane tetracarboxylate; an ink composition wherein the antioxidant is a lightfastness antioxidant selected from the group consisting of (1) antimony dialkyl phosphorodithioate; (2) molybdenum oxysulfide dithio carbamate; (3) nickel-bis(o-ethyl (3,5-di-tert-butyl-4-hydroxybenzyl) phosphonate; and (4) tetrasodium N-(1,2-dicarboxyethyl)-N-octadecyl sulfosuccinamate; an ink composition wherein the colorant is a pigment of cyan, magenta, yellow, black, or mixtures thereof; an ink composition wherein the oxazoline compound possesses a melting point of from about 60° C. to about 120° C., and optionally is stearyl oxazoline or distearyl oxazoline; an ink composition with a viscosity of from about 1 centipoise to about 10 centipoise; an ink composition and which ink generates developed images with crease values of from about 4 to about 12, haze values of from about 5 to about 15, and gloss values of from about 85 to about 95; an ink composition wherein the ink is substantially free of water; an ink composition wherein the colorant is a pigment, or a dye, optionally selected in an amount of from about 0.5 to about 20 percent by weight; a printing process which comprises incorporating into an acoustic ink jet printer the ink of the present invention, and causing droplets of the ink to be ejected in imagewise pattern onto a substrate; an ink process which comprises providing an acoustic ink printer having a pool of the liquid ink and causing droplets of the ink to be ejected in imagewise pattern; a process wherein there are generated images with crease values of from about 4 to about 12, haze values of from about 5 to about 15, gloss values from about 85 to about 95, and which ink possesses an acoustic-loss value of from about 10 to about 80 dB/mm, and which ink possesses a viscosity of from about 1 centipoise to about 10 centipoise at a temperature of from about 125° C. to about 165° C.; an ink comprised of an oxazoline, a mixture of thioureas, an oxime compound, a lightfastness component, an antioxidant and a colorant; an ink wherein the mixture is comprised of a first thiourea and a second thiourea; an ink wherein the oxime is comprised of a mixture of oximes; an ink wherein the thiourea is comprised of a mixture, for example from 2 to about 7, of thioureas; an ink wherein the first thiourea is present in an amount of from about 1 to about 97 percent by weight, and the second thiourea is present in an amount of from about 99 to about 1 percent by weight, and wherein the total of the first and the second is about 100 percent; an ink wherein the first thiourea is present in an amount of from about 60 to about 90 percent by weight, and the second thiourea is present in an amount of from about 5 to about 40 percent by weight, and wherein the total of the first and the second is about 100 percent; an ink which ink is comprised of a first solid thiourea and a second solid thiourea, which second thiourea is dissimilar than the first thiourea; an ink composition comprised of (1) an oxazoline compound; (2) a thiourea compound or mixtures thereof with an optional melting point of from about 25° C. to about 100° C., and with an optional acoustic-loss value of from about 5 to about 40 dB/mm; (3) an oxime compound or mixtures thereof; (4) a lightfastness compound; (5) an antioxidant; and (6) a colorant; an ink which possesses an acoustic-loss value of from about 10 to about 85 dB/mm, a viscosity of from about 1 centipoise to about 15 centipoise at a temperature of from about 125° C. to about 165° C., and which ink yields images with crease values of from about 8 to about 15; an ink composition wherein the thiourea compound is selected from the group consisting of (1) 1-allyl-2-thiourea; (2) 1-allyl-3-(2-hydroxyethyl)-2-thiourea; (3) 1-methyl-2-thiourea; (4) 1-methallyl-3-methyl-2-thiourea; (5) 1,3-dibutyl-2-thiourea; (6) 1,1,3,3-tetramethyl-2-thiourea; (7) N,N'-di-n-propyl thiourea; and (8) 1-benzyl-3-methyl-2-thiourea, and the like; an ink composition wherein the oxime compound is selected from the group consisting of (1) 2,3-butanedione monoxime, (2) acetone oxime, (3) cyclohexanone oxime, (4) 4-(trifluoromethoxy)benzamidoxime, (5) 2-nitrobenzaldoxime, and (6) 1-phenyl-1,2-propanedione 2-oxime, and the like; an ink composition wherein the lightfastness component is selected from the group consisting of (1) 1,1-(1,2-ethane diyl) bis(3,3,5,5-tetramethyl piperazinone); (2) 6-ethoxy-1,2-dihydro-2,2,4-trimethyl quinoline; (3) 2-(4-benzoyl-3-hydroxyphenoxy) ethyl acrylate; (4) 2-dodecyl-N-(2,2,6,6-tetramethyl-4-piperidinyl)succinimide; and (5) 1,2,2,6,6-pentamethyl-4-piperidinyl/β,β,β',β',-tetra methyl-3,9-(2,4,8,10-tetraoxospiro(5,5) undecane)diethyl]-1,2,3,4-butane tetracarboxylate, and the like; an ink composition wherein the antioxidant is a lightfastness antioxidant selected from the group consisting of (1) antimony dialkyl phosphorodithioate; (2) molybdenum oxysulfide dithio carbamate; (3) nickel-bis(o-ethyl(3,5-di-tert-butyl-4-hydroxybenzyl) phosphonate; and (4) tetrasodium N-(1,2-dicarboxyethyl)-N-octadecyl sulfosuccinamate; a printing process which comprises incorporating into an acoustic ink jet printer the invention inks, and causing droplets of the ink to be ejected in imagewise pattern onto a supporting substrate, such as paper or a dye; an ink composition wherein the colorant is a pigment of cyan, magenta, yellow, black, or mixtures thereof; an ink composition wherein the oxazoline compound possesses a melting point of from about 60° C. to about 125° C., and is selected from stearyl oxazoline and distearyl oxazoline; an ink composition with a viscosity of from about 1 centipoise to about 10 centipoise; an ink composition which generates developed images with crease values of from about 4 to about 12, haze values of from about 5 to about 15, and gloss values of from about 85 to about 95; an ink composition which contains no water; a printing process wherein there are generated developed yields images with crease values of from about 4 to about 12, haze values of from about 5 to about 15, gloss values of from about 85 to about 95, and which ink possesses an acoustic-loss value of from about 10 to about 80 dB/mm, and which ink possesses a viscosity of from about 1 centipoise to about 10 centipoise at a temperature of from about 125° C. to about 165° C.; a process which comprises providing an acoustic ink printer having a pool of the invention liquid inks and causing droplets of the ink to be ejected in imagewise pattern; and wherein there are generated images with crease values of from about 4 to about 12, haze values of from about 5 to about 15, gloss values of from about 85 to about 95, and which ink possesses an acoustic-loss value of from about 10 to about 80 dB/mm, and which ink possesses a viscosity of from about 1 centipoise to about 15 centipoise at a temperature of from about 125° C. to about 165° C.; an ink composition wherein the colorant is selected in an amount of from about 0.5 to about 20 percent by weight; an ink composition wherein the oxazoline compound is selected from the group consisting of (1) 5-(hydroxymethyl)-5'(methoxy stearate) oxazoline; (2) 2-stearyl-5-(hydroxymethyl)-5'(methoxy 5 stearate) oxazoline; and (3) mixtures thereof; a composition comprised of a thiourea, an oxime compound, a lightfastness component, an antioxidant and a colorant; and further containing an oxazoline; a composition wherein the thiourea possesses a melting point of from about 25° C. to about 100° C., and the oxazoline possesses a melting point of from about 60° C. to about 120° C.; a composition wherein the oxazoline compound is selected from the group consisting of (1) 5-(hydroxymethyl)-5'(methoxy stearate) oxazoline; (2) 2-stearyl-5-(hydroxymethyl)-5'(methoxy stearate) oxazoline; and (3) mixtures thereof; an ink composition containing an oxime compound selected from the group consisting of (1) 2,3-butanedione monoxime, (2) acetone oxime, (3) is cyclohexanone oxime, (4) 4-(trifluoromethoxy) benzamidoxime, (5) 2-nitrobenzaldoxime, and (6) 1-phenyl-1,2-propanedione 2-oxime; inks comprised of an alkylated oxazoline such as 5-(hydroxymethyl)-5'(methoxy stearate) oxazoline and 2-stearyl-5-(hydroxymethyl)-5'(methoxy stearate) oxazoline of the formula

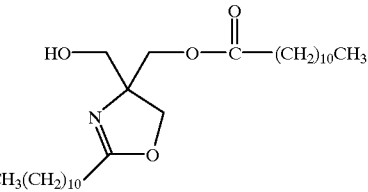

and with, for example, an acoustic-loss value of from about 5 to about 40 dB/mm and a melting point of, for example about 60° C. to about 120° C. or with a low acoustic loss value of below, or equal to about 60 dB/mm, and preferably in the range of between about 5 to about 40 dB/mm; (2) a crease improving thiourea additive with a melting point of lower than about 100° C., and preferably between about 60° C. to about 100° C., and with a low acoustic loss value, and which acoustic loss is, for example, below about 100 dB/mm, and preferably in the range of between about 25 to about 80 dB/mm; (3) gloss improving oxime compound; (4) a UV absorber; (5) an antioxidant; and (6) a colorant and wherein the colorant is present in various suitable amounts.

The oxazoline is preferably a compound with, for example, a melting point of from about 60° C. to about 120° C., and preferably from about 75° C. to 100° C., and is present, for example, in an amount of from about 1 to about 98 percent by weight, the thiourea compound with, for example, an acoustic-loss value of from about 5 to about 40 dB/mm is present in the ink composition in an amount of, for example, from about 39 to about 0.5 percent by weight, the oxime compound, which can function as a gloss improving compound and with, for example, an acoustic-loss value of from about 5 to about 40 dB/mm is present in the ink composition in an amount of, for example, from about 30 to about 0.5 percent by weight, the lightfastness component, such as a UV absorber is present, for example, in an amount of from about 5 to about 0.25 percent by weight, the antioxidant is, for example, present in an amount of from about 5 to about 0.25 percent by weight, and the colorant is, for example, present in an amount of from about 20 to about 0.5 percent by weight, and wherein the total of all ink components is about 100 percent. In embodiments the solid oxazoline compound with, for example, an acoustic-loss value of from about 5 to about 40 dB/mm is present in an amount of from about 15 to about 90 percent by weight, the crease improving thiourea compound, which can function as a crease improving compound and possessing, for example, a melting point of, for example, less than about 100° C. is present in an amount of from about 35 to about 4 percent by weight, the oxime compound with an acoustic-loss value of, for example, from about 5 to about 40 dB/mm is present in the ink composition in an amount of, for example, from about 25 to about 3 percent by weight, the lightfastness UV absorber is present in an amount of from about 5 to about 1 percent by weight, the antioxidant is present in an amount of from about 5 to about 1 percent by weight, and the colorant is present in an amount of from about 15 to about 1 percent by weight.

The ink composition contains, for example, the following range amounts of (1) a solid oxazoline compound; (2) a thiourea, compound with, for example, a melting point of from about 25° C. to about 100° C., and which thiourea can be known thiourea, such as aliphatic and aromatic ureas or mixtures thereof; (3) an oxime compounder mixtures thereof; (4) a lightfastness component; (5) a lightfastness antioxidant; and (6) a colorant: [1+39+30+5+5+20=100] to [98+0.5+0.5+0.25+0.25+0.5=100], and preferred range amounts [15+35+25++5+5+15=100] to [90+4+3+1+1+1=100].

These composition ranges, and the others indicated herein can be established using a number of known techniques, such as a statistical design based on the analyses of the experimental data of viscosity at 150° C., jettability at 150° C., image quality (high optical density, low crease, high gloss), lightfast, and waterfast values of images generated with various ink compositions.

The thiourea compound, which can function as a crease agent with, and for example, a melting point of between about 25° C. to about 100° C. and an acoustic-loss value of, for example, from about 5 to about 40 dB/mm can be selected, for example, from the group consisting of (1) 1-allyl-2-thiourea (Aldrich #10,880-41); (2) 1-allyl-3-(2-hydroxyethyl)-2-thiourea (Aldrich #A3,280-2); (3) 1-methyl-2-thiourea (Aldrich #M8,460-7); (4) 1-methallyl-3-methyl-2-thiourea (Aldrich #19,046-2); (5) 1,3-dibutyl-2-thiourea (Aldrich #D4,959-8); (6) 1,1,3,3-tetramethyl-2-thiourea (Aldrich #11,516-9); (7) N,N'-di-n-propyl thiourea (Alfa Organics #A17217); (8) 1-benzyl-3-methyl-2-thiourea (Aldrich #27,550-6) mixtures thereof, and the like. In embodiments wherein the ink contains mixtures of thioureas, such as from about 2 to about 5 thiourea, and in embodiments 2, the thioureas are dissimilar and each is present in a suitable amount, and wherein the total is about 100 percent, such as from about 25 percent by weight of a first thiourea and about 75 percent by weight of a second thiourea.

Examples of oxazolines include known oxazolines, such as hydroxy alkoxy oxazolines and the like, and more specifically, (1) 5-(hydroxymethyl)-5'(methoxy stearate) oxazoline; (2) 2-stearyl-5-(hydroxymethyl)-5'(methoxy stearate) oxazoline; and (3) mixtures thereof.

Examples of oxime compound include (1) 2,3-butanedione monoxime, (Aldrich #11,213-5); (2) acetone oxime, (Aldrich #A1,050-7); (3) cyclohexanone oxime, (Aldrich #C10,220-2); (4) 4-(trifluoromethoxy) benzamidoxime, (Aldrich #42,223-1); (5) 2-nitrobenzaldoxime, (Aldrich #24,204-7); (6) 1-phenyl-1, 2-propanedione 2-oxime, (Aldrich #22,009-4); and the like. In embodiments, the inks of the present invention can contain a mixture of oxime, such as from about 2 to about 7, and for example 2, and which oximes are present in suitable amounts to permit a total of about 100 percent, for example for two oximes of from about 25 percent by weight of one oxime to about 75 percent by weight of a second oxime is present.

Lightfastness components, that primarily protect the developed images from UV degradation are known and include (1) (N-p-ethoxycarbonylphenyl)-N'-ethyl-N'-phenylformadine, Givaudan Corporation; (2) 1,1-(1,2-ethane-diyl) bis(3,3,5,5-tetramethyl piperazinone), Goodrich Chemicals; (3) 2,2,4-trimethyl-1,2-hydroquinoline, Mobay Corporation; (4) 6-ethoxy-1,2-dihydro-2,2,4-trimethylquinoline, Monsanto-Chemicals; (5) 2,4,6-tris-(N-1,4-dimethylpentyl-4-phenylenediamino)-1,3,5-triazine, Uniroyal Corporation; (6) 2-(4-benzoyl-3-hydroxy phenoxy)ethylacrylate; (7) 2-dodecyl-N-(2,2,6,6-tetramethyl-4-piperidinyl) succinimide; (8) 2-dodecyl-N-(1, 2,2,6,6-pentamethyl-4-piperidinyl) succinimide; (9) N-(1-acetyl-2,2,6,6-tetramethyl-4-piperidinyl)-2-dodecyl succinimide, all four available from Aldrich Chemicals; (10) 2,2,6,6-tetramethyl-4-piperidinyl/β,β,β',β'-tetramethyl-3,9-(2,4,8,10-tetraoxospiro(5,5)-undecane) diethyl]-1,2,3,4-butane tetracarboxylate; (11) [1,2,2,6,6-pentamethyl-4-piperidinyl/β,β,β',β'-tetramethyl-3,9-(2,4,8,10-tetraoxo-spiro-(5,5)undecane) diethyl]-1,2,3,4-butanetetra carboxylate; (12) [2,2,6,6-tetramethyl-4-piperidinyl)-1,2,3, 4-butane tetracarboxylate, all three available from Fairmount Corporation; (13) nickel dibutyl dithio carbamate, available as UV-Chek AM-105 from Ferro Corporation.

Lightfastness antioxidants that primarily protect the developed images from oxidation include (1) antimony dialkyl phosphorodithioate; (2) molybdenum oxysulfide dithio carbamate, both available from Vanderbilt Corporation; (3) (nickel-bis(o-ethyl (3,5-di-tert-butyl-4-hydroxybenzyl) phosphonate, Ciba Geigy Corporation; (4) tetra sodium-N-(1,2-dicarboxyethyl)-N-octadecyl sulfosuccinamate, American Cyanamid Corporation, and the like.

Suitable colorants, present in an effective amount generally of from about 1 to about 25, and for example, from about 2 to about 12 weight percent, include pigments and dyes, with solvent dyes being preferred. Any dye or pigment may be selected, provided that it is, for example, capable of being dispersed or dissolved in the vehicle and is compatible with the other ink components. Colorants include pigments, dyes, mixtures thereof, mixtures of dyes, mixtures of pigments, and the like.

Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E. D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871 K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2GO1 (American Hoechst); Irgalite Blue BCA (Ciba-Geigy); Paliogen Blue 6470 (BASF); Sudan III (Red Orange), (Matheson, Colemen Bell); Sudan II (Orange), (Matheson, Colemen Bell); Sudan Orange G (Aldrich); Sudan Orange 220 (BASF); Paliogen Orange 3040 (BASF); Ortho Orange OR 2673 (Paul Uhlich); Paliogen Yellow 152,1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks, such as REGAL 330® (Cabot), Carbon Black 5250, Carbon Black 5750 (Columbian Chemical Company).

Dye examples include Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.; and the like. Particularly preferred are solvent dyes, and within the class of solvent dyes, spirit soluble dyes are preferred because of their compatibility with the vehicles and dye leveling compounds of the present application. Examples of suitable spirit solvent dyes include Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G, Aizen Spilon Yellow C-GNH (Hodogaya Chemical Company); Sirius Supra Yellow GD 167, Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), and the like. Neozapon Black X51 (C.I. Solvent Black; C.I. #12195) (BASF); Sudan Blue 670 (C.I. #61554) (BASF); Sudan Yellow 146 (C.I. #12700) (BASF); Sudan Red 462 (C.I. #26050) (BASF) are preferred.

The inks of the present invention can be prepared by any suitable method, such as simple mixing of the components. More specifically, a colored phase-change ink composition can be prepared by mixing 70 percent by weight of the compound 2-stearyl-5-(hydroxymethyl)-5'(methoxy stearate) oxazoline having an acoustic-loss value of about 40 dB/mm and a melting point of between about 60° C. to about 120° C.; 10 percent by weight of a crease improving thiourea compound with a melting point of between about 50° C. to about 95° C.; 5 percent by weight of a gloss improving oxime compound; 5 percent by weight of a lighfast UV absorber; 5 percent by weight of lightfast antioxidant; and 5 percent by weight of a colorant. The mixture resulting can then be heated to a temperature of about 1200C and stirred for a period of about 60 minutes until it formed a homogeneous solution, and subsequently was cooled to 25° C.

The inks of the present invention are suitable for printing processes wherein the substrate, such as paper, transparency material, or the like is heated during the printing process to facilitate formation of the liquid crystalline phase within the ink. When transparency substrates are employed, temperatures typically are limited to a maximum of about 100° C. to about 110° C., since the polyester typically employed, as the base sheet in transparency sheets tends to deform at higher temperatures. Specially formulated transparencies and paper substrates can, however, tolerate higher temperatures, and frequently are suitable for exposure to temperatures of 150° C. or even 200° C. in some instances. Typical heating temperatures are from about 40° C. to about 140° C., and preferably from about 60° C. to about 95° C., although the temperature can be outside these ranges.

The inks of the present invention can also be selected for acoustic ink jet printing processes. In acoustic ink jet printing, reference a number of the copending applications and patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, the copending applications, and the appropriate patents recited herein, especially U.S. Pat. No. 4,745,419 and *IBM Technical Disclosure Bulletin*, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered.

Pixel placement accuracy problems that conventional drop on demand and continuous stream ink jet printers has suffered. The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing; (2) matrix configured ejector arrays for matrix printing; and (3) several different types of pagewidth ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), however in other embodiments, the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. AppL Phys.*, vol.65, no. 9 (May 1, 1989) and references therein, the disclosure of which is totally incorporated herein by reference.

The oxazoline, thiourea, oxime, lightfastness compound, such as a UV absorber, and the antioxidant can be crystalline or semicrystalline in the solid state. A material is considered crystalline if it is primarily comprised of crystals having regular arrangement of its atoms in the space lattice. When this arrangement of atoms in the space lattice is irregular, the material is considered as amorphous. The in between state with part of the composition being crystalline and another part amorphous is referred to as semicrystalline. When solidified on a substrate, such as paper or transparency, the invention phase change ink materials can crystallize in spherulitic morphology, and wherein the size of the spherulites is preferably, for example, from about 0.1 to about 10 microns, and most preferably between about 1 and about 4 microns, for optimum projection efficiency. The spherulite size can be measured by an optical microscope with cross polarized light or by the low angle solid state light scattering method (R. S. Stein and M. B. Rhodes, *J. Appl. Phys.*, 31, 1873 (1960)). A monochromatic, vertically polarized light is passed through the sample. The scattered light is analyzed with another nicol prism, with its optic axis horizontal, known as the $H_v$ scattering method. The spherulite size is measured from the location of the maximum intensity in the four-leaf clover scattering pattern. Large spherulites, of size greater than about 10 microns may result in brittle prints. The size of the spherulites can be controlled by, for example, formulating ternary blends of oxazoline, thiourea and oxime compounds. When solidified, the oxazoline, thiourea and oxime compound can form a dispersed phase of small spherulitic crystalline domains in the matrix of each other. This morphology of reduced spherulitic size of from, for example, preferably between about 0.5 to about 1 micrometer measured with an optical microscope can improve the projection efficiency, and increases the crease resistance. Inks with a spherulite size of between about 0.5 to about 1 micrometer may be ideal as these scatter a minimum amount of light thereby improving projection efficiency when printed on transparencies. The resistance to creasing is also increased with reduced spherulite size because primarily of excellent intra molecular bonding between the ink molecules.

Acoustic-loss measurements were measured as follows. Samples of various liquid vehicles, such as the oxazoline, thioureas and oxime compounds were placed between the two transducers, with the temperature set at 150° C. The samples were allowed equilibrate at 150° C. for five minutes. The two transducers were brought together to maximize the acoustic signal. The amplitude and the position of the signals were recorded. The two transducers were separated by a distance varying from 25.4 microns to 125.4 microns recording each time the amplitude and the position of the signal. Each measurement was performed three times and three samples of the same material were measured. The attenuation dB/mm was then calculated by ratioing the amplitude values obtained at different separation distances.

The optical density values of, for example, Black (Neozapon Black X51, C.I. #12195) between 2.1 to 2.3, Cyan (Sudan Blue 670, C.I. #61554) between 1.80 to 1.85, Magenta Sudan Red 462 (C.I. #26050), between 1.90 to 1.95 and Yellow (Sudan Yellow 146, C.I.# 12700) between 1.37 to 1.45, recited herein were obtained on a Pacific Spectrograph Color System. This system consists of two major components, an optical sensor and a data terminal. The optical sensor employs a 6-inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information.

The lightfast values were measured in the Mark V Lightfast Tester obtained from Microscal Company, London, England; and the waterfast values of the ink jet images were obtained with an optical density data recorded before and after washing with water at 25° C. for five minutes.

The viscosity was measured at 150° C. with a Stress Rheometer from Cari-Med model CSL 100. All experiments were performed at a shear rate of 1250 s$^{-1}$.

The average width of the creased image due to pressure was obtained on colored and black solid area images printed on paper by (a) folding inwards the printed area of the image; (b) passing on the folded image a standard Teflon coated copper roll 2 inches in width, 3 inches in outer diameter, 2.25 inches in inner diameter and weighing 860 grams; (c) unfolding the paper and wiping the loose toner from the creased imaged surface with a cotton swab; (d) measuring the average width of the toner free creased area with an image analyzer.

The haze values of the images between, for example, 10 to 30, and preferably between 10 to 20, were measured on images printed on uncoated polyester such as MYLAR® with a Haze meter XL-211, HAZEGARD® System obtained from Pacific Scientific Company.

Other ink components not specifically recited herein may also be selected for the inks of the present invention in embodiments thereof.

The following specific Examples are provided. These examples are intended to be illustrative, and the invention is not limited to the materials, conditions, or process parameters set forth. All parts and percentages are by weight unless otherwise indicated.

The alkylated [2-stearyl-5-(hydroxymethyl)-5'(methoxy stearate) oxazoline] oxazolines can be prepared as follows. To a one liter Parr reactor equipped with a bottom drain valve, double turbine agitator, and distillation receiver with a cold water condenser were charged 568 grams of steric acid, 120 grams of tris(hydroxymethyl) amino methane and 0.6 gram of butyltin hydroxide oxide as the catalyst. The reactor, exposed to the atmosphere, was slowly heated to 100° C., and stirring was commenced. The reactor was carefully heated to a final temperature of 180° C. and kept constant for 30 minutes. As the condensation reaction to yield the product distearyl-oxazoline progressed, water, the byproduct was distilled and collected. House vacuum was then applied to remove the final residual traces of water. The reaction was then cooled to 75° C., and discharged as pale yellow liquid, which solidified to an off-white solid upon further cooling. The melting point of the solid was between about 61° C. to about 62° C. $^1$H NMR and IR spectroscopy confirmed the structure of the material.

EXAMPLE I

A black phase-change ink composition was prepared by mixing 65 percent by weight of 2-stearyl-5-(hydroxymethyl)-5'(methoxy stearate) oxazoline having a melting point of 62° C. and an acoustic-loss value of 35 dB/mm; 10 percent by weight of the crease improving compound 1-allyl-3-(2-hydroxyethyl)-2-thiourea (Aldrich #A3,280-2) having a melting point of 78° C. and an acoustic-loss value of 36 dB/mm; 10 percent by weight of the gloss improving compound cyclohexanone oxime (Aldrich #C10,220-2) having a melting point of 90° C. and an acoustic-loss value of 37 dB/mm; 5 percent by weight of the UV absorber 2-dodecyl-N-(2,2,6,6-tetramethyl-4-piperidinyl) succinimide (Aldrich #41,317-8); 5 percent by weight of the antioxidant tetra sodium-N-(1,2-dicarboxyethyl)-N-octadecyl sulfosuccinamate, Aerosol 22N, American Cyanamid Corporation; and 5 percent by weight of the colorant Neozapon Black X51 (C.I. Solvent Black; C.I. #12195) (BASF). The mixture resulting was heated to a temperature of about 120° C. and stirred for a period of about 60 minutes until it formed a homogeneous solution, and subsequently was cooled to 25° C. The resulting black ink had an acoustic loss value of 37 dB/mm and a viscosity of 4.95 cps at 150° C.

EXAMPLE II

A blue phase-change ink composition was prepared by mixing 65 percent by weight of 2-stearyl-5-(hydroxymethyl)-5'(methoxy stearate) oxazoline having a melting point of 62° C. and an acoustic-loss value of 35 dB/mm; 10 percent by weight of 1,1,3,3-tetramethyl-2-thiourea (Aldrich #11,516-9) having a melting point of 76° C. and an acoustic-loss value of 35 dB/mm; 10 percent by weight of cyclopentanone oxime (Aldrich #C11,243-7) having an acoustic-loss value of 30 dB/mm and a melting point of 54° C.; 5 percent by weight of the UV absorber 2-dodecyl-N-(2,2,6,6-tetramethyl-4-piperidinyl) succinimide (Aldrich #41,317-8); 5 percent by weight of the antioxidant tetra sodium-N-(1,2-dicarboxyethyl)-N-octadecyl sulfosuccinamate, Aerosol 22N, American Cyanamid Corporation; and 5 percent by weight of the colorant Sudan Blue 670 (C.I. #61554) (BASF). The resulting mixture was heated to a temperature of about 120° C. and stirred for a period of about 60 minutes until it formed a homogeneous solution, and subsequently was cooled to 25° C. There resulted a blue ink with an acoustic loss value of 39 dB/mm and a viscosity of 5.15 cps at 150° C.

EXAMPLE III

A yellow phase-change ink composition was prepared by mixing 60 percent by weight of 2-stearyl-5-(hydroxymethyl)-5'(methoxy stearate) oxazoline having a melting point of 62° C. and an acoustic-loss value of 35 dB/mm; 10 percent by weight of 1-methallyl-3-methyl-2-thiourea (Aldrich #19,046-2) having a melting point of 61° C. and an acoustic-loss value of 37 dB/mm; 10 percent by weight of a second thiourea of 1,1,3,3-tetramethyl-2-thiourea (Aldrich #11,516-9) having a melting point of 76° C. and an acoustic-loss value of 35 dB/mm;10 percent by weight of the gloss improving compound cyclohexanone oxime (Aldrich #C1,220-2) having a melting point of 90° C. and an acoustic-loss value of 37 dB/mm; 5 percent by weight of the UV absorber 2-dodecyl-N-(2,2,6,6-tetramethyl-4-piperidinyl) succinimide (Aldrich #41,317-8); 5 percent by weight of the antioxidant tetra sodium-N-(1,2-dicarboxyethyl)-N-octadecyl sulfosuccinamate, Aerosol 22N, American Cyanamid Corporation; and 5 percent by weight of the colorant Neozapon Black X51 (C.I. Solvent Black; C.I. #12195) (BASF). The mixture resulting was heated to a temperature of about 120° C. and stirred for a period of about 60 minutes until it formed a homogeneous solution, and subsequently was cooled to 25° C. The resulting yellow ink had an acoustic loss value of 36 dB/mm and a viscosity of 4.85 cps at 150° C.

EXAMPLE IV

A red phase-change ink composition was prepared by mixing 60 percent by weight of 2-stearyl-5-(hydroxymethyl)-5'(methoxy stearate) oxazoline having a melting point of 62° C. and an acoustic-loss value of 35 dB/mm; 5 percent by weight of 1-methallyl-3-methyl-2-thiourea (Aldrich #19,046-2) having a melting point of 61° C. and an acoustic-loss value of 37 dB/mm; 5 percent by weight of a second thiourea of 1,1,3,3-tetramethyl-2- thiourea (Aldrich #11,516-9) having a melting point of 76° C. and an acoustic-loss value of 35 dB/mm; 10 percent by weight of the gloss improving compound cyclohexanone oxime (Aldrich #C10,220-2) having a melting point of 90° C. and an acoustic-loss value of 37 dB/mm; 5 percent by weight of cyclopentanone oxime (Aldrich #C11,243-7) having an acoustic-loss value of 30 dB/mm and a melting point of 54° C.; 5 percent by weight of a UV absorber 2-dodecyl-N-(2,2,6,6-tetramethyl-4-piperidinyl) succinimide (Aldrich #41,317-8); 5 percent by weight of the antioxidant tetra sodium-N-(1,2-dicarboxyethyl)-N-octadecyl sulfosuccinamate, Aerosol 22N, American Cyanamid Corporation; and 5 percent by weight of the colorant Sudan Red 462 (C.I. #26050) (BASF). The mixture was heated to a temperature of about 120° C. and stirred for a period of about 60 minutes until it formed a homogeneous solution, and subsequently was cooled to 25° C. The red ink resulting had an acoustic loss value of 35 dB/mm and a viscosity of 4.9 cps at 150° C.

EXAMPLE V

Each of the above four inks from Example I to Example IV were incorporated into an acoustic ink jet printer as disclosed in U.S Pat. No. 4,745,419, the disclosure of which is totally incorporated herein by reference, equipped with a carrier for transporting a generally uniformly thick film of hot melt ink across its printhead, together with a heating means for liquefying the ink as it nears the printhead. The droplet ejectors are acoustically coupled to the ink via the carrier, and their output focal plane is essentially coplanar with the free surface of the liquefied ink, thereby enabling them to eject individual droplets of ink therefrom on command. The ink was moved across the printhead at a sufficiently high rate to maintain the free surface which it presents to the printhead at a substantially constant level. A variety of carriers may be employed, including thin plastic and metallic belts and webs, and the free surface of the ink maybe completely exposed or it may be partially covered by a mesh or perforated layer. A separate heating element may be provided for liquefying the ink, or the lower surface of the carrier may be coated with a thin layer of electrically resistive material for liquefying the ink by localized resistive heating. A jetting frequency of 160 MHz was used to generate drops of about 2 picoliters, up to 12 drops per pixel at 600 spi. Each of the above four ink was incorporated into an acoustic ink jet printing test fixture utilizing the ejection mechanism disclosed in *J. Appl. Phys*, 65(9), May 1, 1989, and references therein, the disclosure of which are totally incorporated herein by reference. A jetting frequency of 160 MHz was used to generate drops of about 2 picoliters, up to 12 drops per pixel at 600 spi. The images formed on paper exhibited excellent color quality with optical density values of 2.70 (black), 2.27 (cyan), 2.30 (magenta), 1.45 (yellow), sharp edges, with lightfast values of black (99.5 percent), cyan (99.5 percent), magenta (97 percent), yellow (99 percent), waterfast values of black (99.5 percent), cyan (99 percent), magenta (99 percent), yellow (100 percent). The crease values of black, cyan, magenta and yellow ink images were measured at black (4), cyan (7), magenta (9), yellow (10). The images formed on uncoated MYLAR™ exhibited excellent color quality with optical density values of 2.04 (black), 2.15 (cyan), 1.92 (magenta), 1.5 (yellow), sharp edges. The haze values of the black, cyan, magenta and yellow ink images were measured at black (5), cyan (9), magenta (8), yellow (12); and the gloss values of the images were measured at about 90 for all the above inks. The ink spherulite radius was measured to be between 1 to 2 micrometers, thus permitting haze values of between 5 to 15 when printed on transparencies.

COMPARATIVE EXAMPLE VI

A black phase-change ink composition was prepared by mixing 70 percent by weight of the 2-stearyl-5-(hydroxymethyl)-5'(methoxy stearate) oxazoline having a melting point of 62° C. and an acoustic-loss value of 35 dB/mm; 10 percent by weight of the crease improving compound benzyl N-(2-hydroxyethyl)carbamate (Aldrich #40,790-9), having an acoustic-loss value of 20 dB/mm and a melting point of 60° C.; 5 percent by weight of the gloss improving compound 1-hexadecanol (Aldrich #25,874-1) having an acoustic-loss value of 22 dB/mm and a melting point of 55° C.; 5 percent by weight of the UV absorber 2-dodecyl-N-(2,2,6,6-tetramethyl-4-piperidinyl) succinimide (Aldrich #41,317-8); 5 percent by weight of the antioxidant tetra sodium-N-(1,2-dicarboxyethyl)-N-octadecyl sulfosuccinamate, Aerosol 22N, American Cyanamid Corporation; and 5 percent by weight of the colorant Neozapon Black X51 (C.I. Solvent Black; C.I. #12195) (BASF). The mixture resulting was heated to a temperature of about 120° C. and stirred for a period of about 60 minutes until it formed a homogeneous solution, and subsequently was cooled to 25° C. The resulting black ink had an acoustic loss value of 41 dB/mm and a viscosity of 5.15 cps at 150° C.

COMPARATIVE EXAMPLE VII

A blue phase-change ink composition was prepared by mixing 70 percent by weight of 2-stearyl-5-(hydroxymethyl)-5'(methoxy stearate) oxazoline having a melting point of 62° C. and an acoustic-loss value of 35 dB/mm; 10 percent by weight of (S)-(–)-tetrahydro-5-oxo-3-furanyl carbamate (Aldrich #41,924-9) having a melting point of 104° C. and an acoustic-loss value of 38 dB/mm; 5 percent by weight of 1,3-dioxane-5,5-dimethanol (Aldrich #22,062-0), having an acoustic-loss value of 24 dB/mm and a melting point of 60° C.; 5 percent by weight of a UV absorber 2-dodecyl-N-(2,2,6,6-tetramethyl-4-piperidinyl) succinimide (Aldrich #41,317-8); 5 percent by weight of an antioxidant tetra sodium-N-(1,2-dicarboxyethyl)-N-octadecyl sulfosuccinamate, Aerosol 22N, American Cyanamid Corporation; and 5 percent by weight of the colorant Sudan Blue 670 (C.1. #61554) (BASF). The resulting mixture was heated to a temperature of about 120° C. and stirred for a period of about 60 minutes until it formed a homogeneous solution, and subsequently was cooled to 25° C. There resulted a blue ink with an acoustic loss value of 39 dB/mm and a viscosity of 5.15 cps at 150° C.

COMPARATIVE EXAMPLE VIII

A yellow phase-change ink composition was prepared by mixing 70 percent by weight of 2-stearyl-5-(hydroxymethyl)-5'(methoxy stearate) oxazoline having a melting point of 62° C. and an acoustic-loss value of 35 dB/mm;10 percent by weight of crease improving compound tert-butyl-(2,4-dinitrophenoxy) carbamate (Aldrich #33,305-0) having a melting point of 79° C. and an acoustic-loss value of 37 dB/mm; 5 percent by weight of a gloss improving compound cyclooctanediol (Aldrich #17,903-5) having an acoustic-loss value of 26 dB/mm and a melting point of 79° C.; 5 percent by weight of a UV absorber 2-dodecyl-N-(2,2,6,6-tetramethyl-4-piperidinyl) succinimide (Aldrich #41,317-8); 5 percent by weight of an antioxidant tetrasodium-N-(1,2-dicarboxyethyl)-N-octadecyl sulfosuccinamate, Aerosol 22N, American Cyanamid Corporation; and 5 percent by weight of the colorant Sudan Yellow 146 (C.I. #12700) (BASF). The mixture resulting was heated to a temperature of about 100° C. and stirred for a period of about 60 minutes until it formed a homogeneous solution, and subsequently was cooled to 25° C. There resulted a yellow ink with an acoustic loss value of 38 dB/mm and a viscosity of 5.05 cps at 150° C.

COMPARATIVE EXAMPLE IX

A red phase-change ink composition was prepared by mixing 70 percent by weight of 2-stearyl-5-(hydroxymethyl)-5'(methoxy stearate) oxazoline having a melting point of 62° C. and an acoustic-loss value of 35 dB/mm; 10 percent by weight of the crease improving compound cyanomethyl-N,N-dimethyl dithiocarbamate (Aldrich #28,054-2) having a melting point of 75° C. and an acoustic-loss value of 37 dB/mm; 5 percent by weight of a gloss improving compound, 1-docosanol (Aldrich #16,910-2) having an acoustic-loss value of 30 dB/mm and a melting point of 70° C.; 5 percent by weight of a UV absorber 2-dodecyl-N-(2,2,6,6-tetramethyl-4-piperidinyl) succinimide (Aldrich #41,317-8); 5 percent by weight of the antioxidant tetra sodium-N-(1,2-dicarboxyethyl)-N-octadecyl sulfosuccinamate, Aerosol 22N, American Cyanamid Corporation; and 5 percent by weight of the colorant Sudan Red 462 (C.I. #26050) (BASF). The mixture was heated to a temperature of about 120° C. and stirred for a period of about 60 minutes until it formed a homogeneous solution, and subsequently was cooled to 25° C. The red ink resulting had an acoustic loss value of 38 dB/mm and a viscosity of 5.02 cps at 150° C.

COMPARATIVE EXAMPLE X

Each of the above four (Comparative) inks was incorporated into an acoustic ink jet printing test fixture. A jetting frequency of 160 MHz was used to generate drops of about 2 picoliters, up to 12 drops per pixel at 600 spi. The images formed on paper exhibited excellent color quality with optical density values of 2.30 (black), 1.87 (cyan), 1.90 (magenta), 1.35 (yellow), sharp edges, with lightfast values of black (99.5 percent), cyan (99.5 percent), magenta (97 percent), yellow (99 percent), waterfast values of black (99.5 percent), cyan (99 percent), magenta (99 percent), yellow (100 percent). The crease values of black, cyan, magenta and yellow ink images were measured at black (12), cyan (13), magenta (15), yellow (10). The images formed on uncoated MYLAR™ exhibited excellent color quality with optical density values of 1.54 (black), 1.52 (cyan), 1.42 (magenta), 0.96 (yellow), sharp edges. The haze values of the black, cyan, magenta and yellow ink images were measured at black (15), cyan (18), magenta (10), yellow (14); and the gloss values of the images were measured at about 90 for all the above inks. The ink spherulite radius was measured to be between 1 to 3 micrometers, thus permitting haze values of between 10 to 20 when printed on transparencies.

Other modifications of the present invention may occur to those of ordinary skill in the art subsequent to a review of the present application, and these modifications, including equivalents thereof, are intended to be included within the scope of the present invention.

What is claimed is:

1. An ink composition comprised of (1) an oxazoline compound; (2) a thiourea compound; (3) an oxime compound; (4) a lightfastness compound; (5) an antioxidant; and (6) a colorant.

2. An ink composition in accordance with claim 1 wherein said thiourea compound is comprised of a mixture of thioureas, and said oxime is comprised of a mixture of oximes.

3. An ink composition in accordance with claim 1 wherein said thiourea possesses a melting point of from about 25° C. to about 100° C. and an acoustic loss of from about 5 to about 85 dB/mm.

4. An ink composition in accordance with claim 1 which possesses an acoustic-loss value of from about 10 to about 80 dB/mm, a viscosity of from about 1 centipoise to about 12 centipoise at a temperature of from about 125° C. to about 165° C., and which ink yields images with crease values of from about 5 to about 15.

5. An ink composition in accordance with claim 1 wherein said thiourea compound is selected from the group consisting of (1) 1-allyl-2-thiourea; (2) 1-allyl-3-(2-hydroxyethyl)-2-thiourea; (3) 1-methyl-2-thiourea; (4) 1-methallyl-3-methyl-2-thiourea; (5) 1,3-dibutyl-2-thiourea; (6) 1,1,3,3-tetramethyl-2-thiourea; (7) N,N'-di-n-propyl thiourea; and (8) 1-benzyl-3-methyl-2-thiourea.

6. An ink composition in accordance with claim 1 wherein said oxime compound is selected from the group consisting of (1) 2,3-butanedione monoxime, (2) acetone oxime, (3) cyclohexanone oxime, (4) 4-(trifluoromethoxy) benzamidoxime, (5) 2-nitrobenzaldoxime, and (6) 1-phenyl-1,2-propanedione 2-oxime.

7. An ink composition in accordance with claim 1 wherein the oxazoline compound is selected from the group consisting of (1) 5-(hydroxymethyl)-5'(methoxy stearate) oxazoline; (2) 2-stearyl-5-(hydroxymethyl)-5'(methoxy stearate) oxazoline; and (3) mixtures thereof.

8. An ink composition in accordance with claim 1 wherein the lightfastness compound is selected from the group consisting of (1) 1,1-(1,2-ethane diyl) bis(3,3,5,5-tetramethyl piperazinone); (2) 6-ethoxy-1,2-dihydro-2,2,4-trimethyl quinoline; (3) 2-(4-benzoyl-3-hydroxyphenoxy) ethyl acrylate; (4) 2-dodecyl-N-(2,2,6,6-tetramethyl-4-piperidinyl)succinimide; and (5) 1 ,2,2,6,6-pentamethyl-4-piperidinyl/β,β,β',β',-tetra methyl-3,9-(2,4,8,10-tetraoxospiro(5,5) undecane) diethyl]-1 ,2,3,4-butane tetracarboxylate.

9. An ink composition in accordance with claim 1 wherein said antioxidant is a lightfastness antioxidant selected from the group consisting of (1) antimony dialkyl phosphorodithioate; (2) molybdenum oxysulfide dithio carbamate; (3) nickel-bis(o-ethyl(3,5-di-tert-butyl-4-hydroxybenzyl) phosphonate; and (4) tetrasodium N-(1,2-dicarboxyethyl)-N-octadecyl sulfosuccinamate.

10. An ink composition in accordance with claim 1 wherein the colorant is a pigment of cyan, magenta, yellow, black, or mixtures thereof.

11. An ink composition in accordance with claim 1 wherein the oxazoline compound possesses a melting point of from about 60° C. to about 120° C., and is stearyl oxazoline or distearyl oxazoline.

12. An ink composition in accordance with claim 1 with a viscosity of from about 1 centipoise to about 10 centipoise.

13. An ink composition in accordance with claim 1 and which ink generates developed images with crease values of from about 4 to about 12, haze values of from about 5 to about 15, and gloss values of from about 85 to about 95.

14. An ink composition in accordance with claim 1 wherein said ink is substantially free of water.

15. An ink composition in accordance with claim 1 wherein the colorant is a pigment, or a dye, selected in an amount of from about 0.5 to about 20 percent by weight.

16. A printing process which comprises incorporating into an acoustic ink jet printer the ink of claim 1, and causing droplets of the ink to be ejected in imagewise pattern onto a substrate.

17. A process which comprises providing an acoustic ink printer having a pool of the liquid ink of claim 1 and causing droplets of the ink to be ejected in imagewise pattern.

18. A process in accordance with claim 17 wherein there are generated images with crease values of from about 4 to about 12, haze values of from about 5 to about 15, gloss values from about 85 to about 95, and which ink possesses an acoustic-loss value of from about 10 to about 80 dB/mm, and which ink possesses a viscosity of from about 1 centipoise to about 10 centipoise at a temperature of from about 125° C. to about 165° C.

19. An ink comprised of an oxazoline, a mixture of thioureas, an oxime compound, a lightfastness component, an antioxidant and a colorant.

20. An ink in accordance with claim 19 wherein said mixture is comprised of a first thiourea and a second thiourea.

21. An ink in accordance with claim 19 wherein the oxime is comprised of a mixture of oximes.

22. An ink in accordance with claim 19 wherein the thiourea is comprised of a mixture of thioureas.

23. An ink in accordance with claim 20 wherein said first thiourea is present in an amount of from about 1 to about 97 percent by weight, and said second thiourea is present in an amount of from about 99 to about 1 percent by weight, and wherein the total of said first and said second is about 100 percent.

24. An ink in accordance with claim 20 wherein said first thiourea is present in an amount of from about 60 to about 90 percent by weight, and said second thiourea is present in an amount of from about 5 to about 40 percent by weight, and wherein the total of said first and said second is about 100 percent.

25. An ink in accordance with claim 1 which ink is comprised of a first solid thiourea and a second solid thiourea, which second thiourea is dissimilar than said first thiourea.

* * * * *